United States Patent
Qiu et al.

(10) Patent No.: US 12,519,814 B2
(45) Date of Patent: Jan. 6, 2026

(54) NETWORK ATTACK PREDICTION METHOD, DEVICE, COMPUTER EQUIPMENT AND STORAGE MEDIUM

(71) Applicant: DALIAN UNIVERSITY, Dalian (CN)

(72) Inventors: Shaoming Qiu, Dalian (CN); Yahui Wang, Dalian (CN); Yana Lv, Dalian (CN); Fen Chen, Dalian (CN); Jiancheng Zhao, Dalian (CN)

(*) Notice: Subject to any disclaimer, the term of this patent is extended or adjusted under 35 U.S.C. 154(b) by 31 days.

(21) Appl. No.: 18/528,837

(22) Filed: Dec. 5, 2023

(65) Prior Publication Data

US 2024/0406199 A1 Dec. 5, 2024

Related U.S. Application Data

(63) Continuation of application No. PCT/CN2023/117595, filed on Sep. 8, 2023.

(30) Foreign Application Priority Data

May 29, 2023 (CN) .................. 202310614307.X

(51) Int. Cl.
H04L 9/40 (2022.01)
(52) U.S. Cl.
CPC ................ H04L 63/1425 (2013.01)
(58) Field of Classification Search
CPC .............................................. H04L 63/1425
USPC ............................................... 726/23
See application file for complete search history.

(56) References Cited

FOREIGN PATENT DOCUMENTS

| CN | 111371607 A | * | 7/2020 | ............ G06N 3/006 |
|---|---|---|---|---|
| CN | 113300884 A | * | 8/2021 | ........... G06K 9/6369 |
| CN | 114124517 A | * | 3/2022 | ............ G06N 3/006 |
| CN | 114676645 A | * | 6/2022 | |
| CN | 115951577 A | * | 4/2023 | |

OTHER PUBLICATIONS

Nadimi-Shahraki et al., An improved grey wolf optimizer for solving engineering problems, Expert Systems With Applications, pp. 1-25 (2020) (Year: 2020).*

(Continued)

Primary Examiner — David P Zarka

(57) ABSTRACT

A network attack prediction method includes: performing preprocessing, time series modeling and data feature analysis on the network traffic data set; dividing the network traffic data set into a normal traffic data set and an attack traffic data set; initializing parameters of the improved grey wolf algorithm; constructing a prediction model and initializing parameters of the prediction model; using the grey wolf optimizer GWO search strategy to obtain a first candidate of the optimal grey wolf; using the hunting DLH search strategy to obtain another candidate of the optimal grey wolf; selecting an optimal candidate; updating $X_i(t)$ with the optimal candidate; judging whether to iterate to the maximum iterations; obtaining an optimal parameter combination of the prediction model and training the prediction model; obtaining an optimized convergent prediction model and identifying anomalies caused by network attacks.

9 Claims, 11 Drawing Sheets

(56) References Cited

OTHER PUBLICATIONS

Jieren te al., DDOS Attack Detection Method Based on LSTM Traffic Prediction, Journal of Huazhong University of Science and Technology, pp. 32-36 (2019) (Year: 2019).*

Wang et al., An improved hybrid highway traffic flow prediction model based on machine learning, Sustainability, pp. 1-22 ( 2020) (Year: 2020).*

Mingjun et al., Dam deformation prediction based on modified grey wolf optimization algorithm and support vector machine, Journal of Physics: Conference Series, pp. 1-8 (2021) (Year: 2021).*

Qiu et al., Optimizing BiLSTM Network Attack Prediction Based on Improved Gray Wolf Algorithm, Applied Sciences, pp. 1-16 (2023) (Year: 2023).*

* cited by examiner

NETWORK ATTACK PREDICTION METHOD, DEVICE, COMPUTER EQUIPMENT AND STORAGE MEDIUM

CROSS REFERENCE TO THE RELATED APPLICATION

This application is a continuation application of International Application No. PCT/CN2023/117595, filed on Sep. 8, 2023, which is based upon and claims priority to Chinese Patent Application No. 202310614307.X, filed on May 29, 2023, the entire contents of which are incorporated herein by reference.

TECHNICAL FIELD

The present disclosure relates to the technical field of network security, in particular to a network attack prediction method, device, computer equipment and storage medium.

BACKGROUND

Network security is extremely important, because network security includes all forms of data security and information security, and with the continuous development of network information technology, information leakage, phishing and other incidents continue to occur. People are increasingly aware of the importance of network security while enjoying the convenience brought by the network. The existing security protection schemes include firewall, data encryption, intrusion detection system and other technologies, wherein firewall and data encryption are passive security protection technologies, and can only protect network security after network attacks. While intrusion detection system is a proactive security protection technology, and can effectively perceive network attacks and provide response decisions for security managers by monitoring the network in real time.

DoS and DDoS attacks are based on time series and occur aperiodically, which consume network bandwidth and system resources by producing and sending large amounts of useless data, thus making the attacked host unable to communicate with the outside world normally. DoS and DDoS attacks include a wide variety of types, such as UDP flood, ACK type, DNS amplification request, NTP amplification type, TCP flood, HTTP flood, SYN flood, etc. These attacks are aimed at consuming the bandwidth, memory and CPU resources of the server, so that the server can only refuse or provide services with poor performance due to resource exhaustion.

SUMMARY

The purpose of the present disclosure is to provide a network attack prediction method, device, computer equipment and storage medium, which can identify anomalies caused by network attacks and reduce the problems of information leakage and resource waste caused by network attacks.

In order to achieve the above objectives, the present disclosure provides the following solutions:

In a first aspect, the present disclosure provides a network attack prediction method, comprising:

S1: acquiring a network traffic data set;
S2: preprocessing the network traffic data set;
S3: performing time series modeling on the preprocessed network traffic data set to obtain a time series;
S4: performing data feature analysis on the time series to obtain a feature analysis result;
S5: based on the feature analysis result, dividing the network traffic data set into a normal traffic data set and an attack traffic data set according to the network traffic;
S6: initializing parameters of the improved grey wolf algorithm;
S7: constructing a prediction model and initializing parameters of the prediction model;
S8: using the grey wolf optimizer GWO search strategy to obtain a first candidate of the optimal grey wolf $X_{IGWO}$ (t+1);
S9: using the hunting dimension learning hunting (DLH) search strategy to obtain another candidate of the optimal grey wolf Www (t+1);
S10: comparing the fitness values of the first candidate $X_{IDLH}$(t+1) and another candidate $X_{IDLH}$(t+1), and selecting an optimal candidate;
S11: judging whether the fitness value of the optimal candidate is less than $X_i$(t) or not;
S12: if yes, updating $X_i$(t) with the optimal candidate; otherwise, keeping $X_i$(t) unchanged in the matrix Pop; $X_i$(t) represents the position of the i-th wolf in the t-th iteration;
S13: judging whether to iterate to the maximum iterations; if not, executing the next step; otherwise, increasing the iterations by 1, and jumping to S8;
S14: obtaining an optimal parameter combination of the prediction model;
S15: training the prediction model based on the optimal parameter combination, obtaining an optimized convergent prediction model;
S16: based on the optimized convergent prediction model, identifying anomalies caused by network attacks.

Alternatively, the network traffic data set comprises Internet traffic ec_data, network traffic DARPA99 and DDOS attack data set DARPA00.

Alternatively, preprocessing the network traffic data set specifically comprises the following steps:

normalizing the ec_data;
performing data sampling operation on the DARPA99 data set and the DARPA00 data set at a time interval of 1 min, obtaining the number of data packets per minute as the statistical characteristics IP packet statistical signature (IPDCF) of internet protocol (IP) data packets:

$$IPDCF = \sum_{T_i < t < T_{i+1}} P_t$$

wherein $T_{i+1} - T_i = 1$ mir, $P_t$ is data packet.

Alternatively, performing data feature analysis on the time series to obtain a feature analysis result specifically comprises the following steps:

sampling the IPDCF at a time interval of $\Delta t = 1$ min, and calculating the IPDCF value of each sampling, and after m times of sampling, obtaining a period T:

$$T(M, \Delta t) = \{IPDCF, i = 1, 2, \ldots, M\}$$

wherein M is the data set length, $\Delta t = 1$ min.

Alternatively, initializing parameters of the improved grey wolf algorithm specifically comprises the following steps:

randomly generating wolves, the total number N=50, the maximum iterations Maxiter=10 and the dimension D of the problem is the number of BiLSTM optimization parameters D=4, the number neurons 1 and neurons 2 of hidden layer units, the forgetting rate dropout and the batch size of BiLSTM correspond to the parameter coordinates of individual positions of wolves, and the upper and lower limits are set ub=[200, 200, 0.9, 10], lb=[32, 32, 0.1, 1];

the position of the i-th wolf in the t-th iteration is expressed as:

$$X_i(t) = \{x_{i1}, x_{i2}, \ldots, x_{iD}\} 0 \le i \le N$$

wherein, the whole population of wolves is stored in a matrix with N rows and D columns, and D is the dimension of the problem.

Alternatively, using the grey wolf optimizer GWO search strategy to obtain a first candidate of the optimal grey wolf $X_{IGWO}(t+1)$ specifically comprises the following steps:

according to the fitness value, dividing the wolves into four grades: α, β, δ, ω; and; α as the optimal solution, β as the suboptimal solution, δ as the best solution, ω as the candidate solution, the hunting process is guided by α, β and δ, ω follows α, β and δ to advance to the prey, and the position of the prey corresponds to the solution of the problem;

three wolves α, β, δ with the minimum fitness value are selected for GWO search, and the positions of other gray wolves ω are updated to get the first candidate $X_{IGWO}(t+1)$;

using the hunting DLH search strategy to obtain another candidate of the optimal grey wolf $X_{IDLH}(t+1)$ specifically adopt the following formula:

$$X_{IDLH,d}(t+1) = X_{i,d}(t) + ran \times (X_{n,d}(t) - X_{r,d}(t))$$

wherein, $X_{n,d}(t)$ is a random neighbor selected from the neighborhood $N_i(t)$ constructed by DLH search strategy and $X_{r,d}(t)$ is a random wolf selected from the matrix Pop; $X_{i,d}(t)$ represents the position of the i-th wolf in the t-th iteration in the d-th dimension;

$$N_i(t) = \{x_{i,d}(t) \mid D_i(X_i(t), X_j(t)) \le R_i(t), X_j(t) \in Pop\}$$

$$R_i(t) = \|X_i(t) - X_{IGWO}(t+1)\|$$

wherein $D_i$ is the Euclidean distance between $X_i(t)$ and $X_j(t)$; $R_i(t)$ is the radius of the neighborhood, $X_i(t)$ represents the position of the i-th wolf in the t-th iteration and $X_j(t)$ represents the position of the j-th wolf in the t-th iteration.

Alternatively, based on the optimized convergent prediction model, identifying anomalies caused by network attacks specifically comprises the following steps:

inputting the attack traffic data set into the optimized convergent prediction model to perform the attack experiment;

performing statistical analysis on the IPDCF value intervals of normal flow and predicted flow to obtain the IPDCF value intervals [a, b] and [c, d] of normal flow and predicted flow;

acquiring the maximum value Z of the IPDCF value interval [c, d] of the predicted flow;

calculating the average error A between the IPDCF value of the predicted flow and the IPDCF value of the normal network, and setting a threshold U=Z+A;

when the deviation X between the real value and the predicted value is greater than or equal to the preset threshold U, it is considered as abnormal traffic, and can be judged that there is network attack behavior;

when the deviation X between the real value and the predicted value is less than the preset threshold U, it is considered that normal network congestion has occurred.

In a second aspect, the present disclosure provides a network attack prediction device, comprising:

a network traffic data set acquisition module, configured to acquire the network traffic data set;

and a processing module, configured to preprocess the network traffic data set;

a time series modeling module, configured to perform time series modeling on the preprocessed network traffic data set to obtain a time series;

a feature analysis module, configured to perform data feature analysis on the time series to obtain a feature analysis result;

a network traffic data set dividing module, configured to divide the network traffic data set into a normal traffic data set and an attack traffic data set according to the network traffic based on the feature analysis result;

an initialization module, configured to initialize parameters of the improved grey wolf algorithm;

a prediction model construction module, configured to construct the prediction model and initialize parameters of the prediction model;

a first candidate determination module, configured to obtain a first candidate $X_{IGWO}(t+1)$ of the optimal grey wolf by using the grey wolf optimizer GWO search strategy;

a second candidate determination module, configured to obtain another candidate $X_{IDLH}(t+1)$ of the optimal grey wolf by using the hunting DLH search strategy;

a comparison module, configured to compare the fitness values of the first candidate $X_{IGWO}(t+1)$ and another candidate $X_{IDLH}(t+1)$ and select the optimal candidate;

a first judging module, configured to judge whether the fitness value of the optimal candidate is less than $X_i(t)$ or not;

an updating module, if yes, configured to update $X_i(t)$ with the optimal candidate, and otherwise, keep $X_i(t)$ unchanged in the matrix Pop; $X_i(t)$ represents the position of the i-th wolf in the t-th iteration;

a second judging module, configured to judge whether to iterate to the maximum iterations, if not, executing the next step, otherwise, increasing the iterations by 1 and jumping to the first candidate determination module;

an optimal parameter combination determination module, configured to obtain the optimal parameter combination of the prediction model;

a training module, configured to train the prediction model based on the optimal parameter combination to obtain an optimized convergent prediction model;

a network attack identification module, configured to identify anomalies caused by network attacks based on the optimized convergent prediction model.

In a third aspect, the present disclosure provides a computer equipment, comprising: a memory and a processor, wherein the memory stores a computer program, and the processor implements the above method by executing the computer program.

In a fourth aspect, the present disclosure provides a computer-readable storage medium, on which a computer program is stored, which, when executed by a processor, implements the above method.

According to the specific embodiment provided by the disclosure, the present disclosure has the following beneficial effects:

the present disclosure provides an IGWO-BiLSTM network attack prediction model, the IGWO method can solve the problems of slow convergence of the original GWO, premature loss of diversity of the population, easy to fall into local optimum and the like. By predicting normal network traffic and setting a reasonable threshold, the IGWO-BiLSTM can identify anomalies caused by network attacks and reduce the problems of information leakage and resource waste caused by network attacks.

BRIEF DESCRIPTION OF THE DRAWINGS

In order to describe the technical schemes in the embodiments of the present disclosure or in the prior more clearly, the following will briefly introduce the drawings required to be used in the description of the examples. It is evident that the drawings in the following description are only examples of the present disclosure, and those ordinary skilled in the art may still obtain other drawings based on the provided drawings without creative work.

DETAILED DESCRIPTION OF THE EMBODIMENTS

Figure 1:
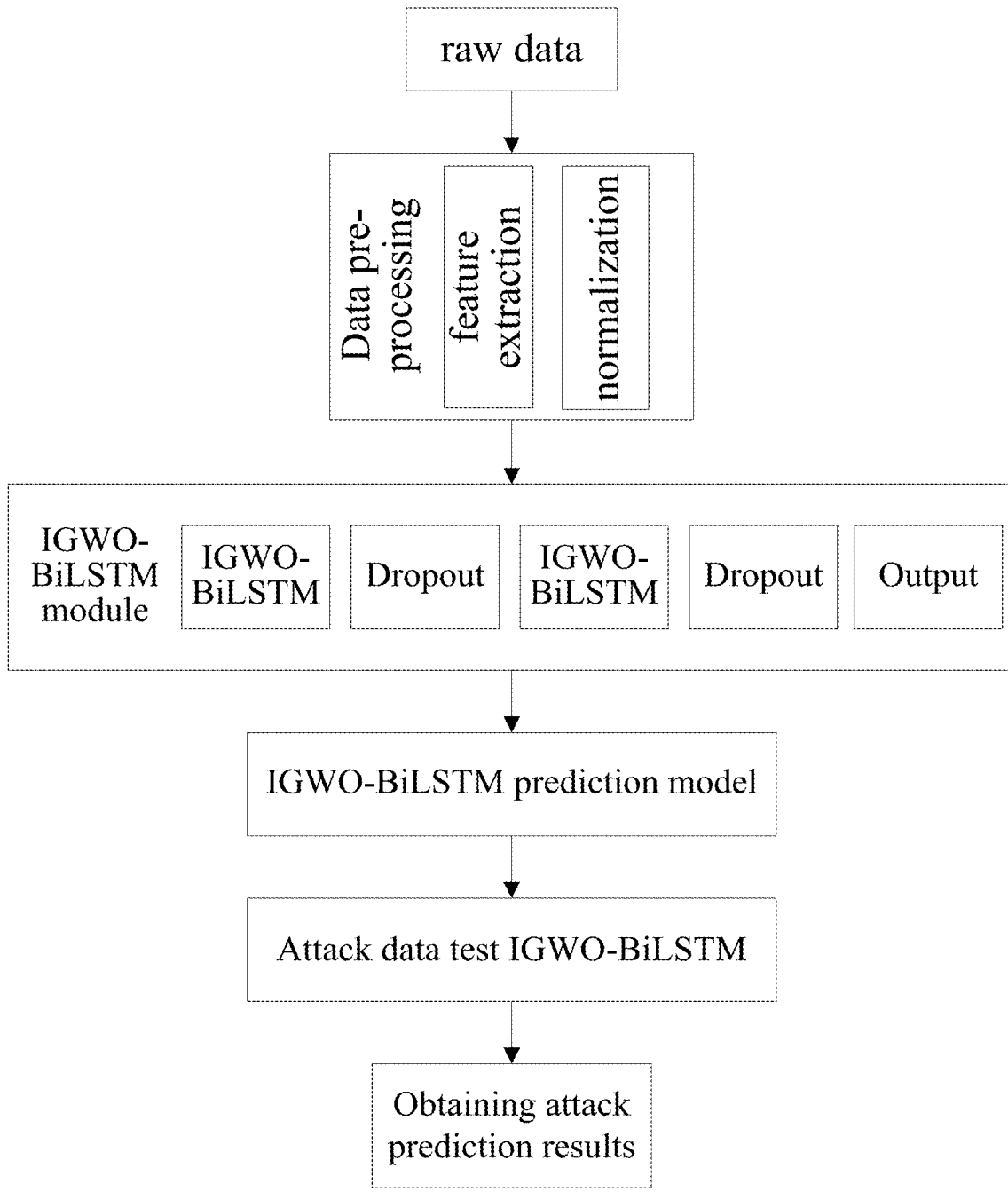
FIG. 1 is a schematic structural diagram of the IGWO-BiLSTM model of the present disclosure.

The technical solutions in the examples of the present disclosure will be clearly and completely described below with reference with drawings in the examples. It is evident that the described examples are only a part of examples and not all of them. Based on the examples of the present disclosure, all other examples obtained by those ordinary skilled in the art without creative work shall fall within the protection scope of the present disclosure.

An objective of the present disclosure is to provide a network attack prediction method, device, computer equipment and storage medium, which can identify anomalies caused by network attacks and reduce the problems of information leakage and resource waste caused by network attacks.

In order to make the above-mentioned objectives, features and advantages of the present disclosure more clearly and easy to understand, the present disclosure will be described in further detail below with reference with drawings and detailed description.

The present disclosure provides a network attack prediction method, comprising:

S1, acquiring a network traffic data set.

The present disclosure select three data sets, namely, Internet traffic (represented by ec_data) from a private Internet service provider (ISP); 3-week network traffic collected by Lincoln Laboratory of MIT in 1999 (represented by DARPA99); DDOS attack data set collected by Lincoln Lab of MIT in 2000 (represented by DARPA00). Among them, ec_data data set and DARPA99 data set are used to prove the universality of the prediction model, and DARPA00 data set is used to carry out attack experiments.

S2, preprocessing the network traffic data set.

Specifically, the ec_data data set counted 14,772 groups of network traffic data from Jul. 6, 2005 to Jul. 28, 2005, sampled at 5-minute intervals, and the data set was normalized, $$\hat{x} = \frac{x - x_{min}}{x_{max} - x_{min}} \quad (1)$$

Wherein $\hat{x}$ is the normalized value, $x$ is the original value, $x_{min}$ is the minimum value and $x_{min}$ $X_{max}$ is the maximum value;

DARPA99 data set provides three weeks of training data for DARPA intrusion detection in 1999, in which the first and third weeks do not contain any attacks as training data, and the second week contains a subset of attacks in 1998 and several new attacks as test data. The DARPA99 data set and DARPA00 data set are sampled at a time interval of 1 min, and the number of packets per minute is obtained as the statistical feature of IP packets (IPDCF), $$IPDCF = \sum_{T_i < t < T_{i+1}} P_t \quad (2)$$

wherein, $T_{i+1} - T_i = 1$ mir, $P_t$ is data packet.

S3, performing time series modeling on the preprocessed network traffic data set to obtain a time series.

S4, performing data feature analysis on the time series to obtain a feature analysis result.

the IPDCF in step S2 is sampled at a time interval of $\Delta t=1$ min, and the IPDCF value of each sampling is calculated, and after m times of sampling, a period T is obtained:

$$T(M, \Delta t) = \{IPDCF, i = 1, 2, \ldots, M\} \quad (3)$$

wherein M is the data set length, $\Delta t=1$ min.

The ec_data data set has the characteristics of periodicity on the macro level and frequent outbreaks on the micro level.

DARPA99 data set takes d as the cycle and min as the time interval, and the data at a fixed time every day presents a relatively fixed trend.

S5, based on the feature analysis result, dividing the network traffic data set into a normal traffic data set and an attack traffic data set according to the network traffic.

Specifically comprising the following step:

S5.1: using normal network traffic data to train the prediction model, and using attack traffic data to conduct attack experiments.

S5.2: dividing the time series obtained in S2 and S3 into training set and testing set according to the ratio of 7:3;

S5.3: using sliding window technology on the normal traffic data and attack traffic data respectively, selecting a window with a length of 60 and a width of 1, setting a step size to 10, and performing sliding interception on the time series network traffic data.

S6, initializing parameters of the improved grey wolf algorithm.

Specifically comprising: randomly generating wolves, the total number N=50, the maximum iterations Maxiter=10 and the dimension D of the problem is the number of BiLSTM optimization parameters D=4, the number (neurons 1 and neurons 2) of hidden layer units, the forgetting rate dropout and the batch size of BiLSTM correspond to the parameter coordinates of individual positions of wolves, and the upper and lower limits are set ub=[200, 200, 0.9, 10], lb=[32, 32, 0.1, 1];

the position of the i-th wolf in the t-th iteration is expressed as:

$$X_i(t) = \{x_{i1}, x_{i2}, \ldots, x_{iD}\} 0 \le i \le N$$

wherein, the whole population of wolves is stored in a matrix with N rows and D columns, and D is the dimension of the problem.

S7: constructing a prediction model and initializing parameters of the prediction model.

Specifically comprising:

the selecting BiLSTM model includes: two layers of BiLSTM, one layer of Dropout and one layer of Dense;

the number of hidden layer units, forgetting rate, batch size are respectively initialized to: neurons 1=128, neurons 2=64, dropout=0.4, batch_size=5, and the maximum iterations of BiLSTM is 500;

The fitness function is the Mean Squared Error (MSE) between the predicted value and the real value, and the fitness value of individual wolves is calculated by Formula (4) and returned to IGWO, $$MSE = \frac{1}{n}\sum_{i=1}^{n}(Y_i - \hat{Y}_i)^2 \quad (4)$$

wherein $Y_i$ is the real value and $\hat{Y}_i$ is the predicted value.

S8: using the grey wolf optimizer GWO search strategy to obtain a first candidate of the optimal grey wolf $X_{IGWO}(t+1)$.

S9: using the hunting DLH search strategy to obtain another candidate of the optimal grey wolf $X_{IDLH}(t+1)$.

Specifically comprising:

according to the fitness value, dividing the wolves into four grades: α, β, δ, ω; and; α as the optimal solution, β as the suboptimal solution, δ as the best solution, ω as the candidate solution, the hunting process is guided by α, β and δ, ω follows α, β and δ to advance to the prey, and the position of the prey corresponds to the solution of the problem;

MSE is the expected value of the square of the difference between the real value and the predicted value. The greater the expected value, the greater the error, three wolves α, β, δ with the minimum fitness value are selected for GWO search, and the positions of other gray wolves ω are updated to get the first candidate $X_{IGWO}(t+1)$;

S10: comparing the fitness values of the first candidate $X_{IGWO}(t+1)$ and another candidate $X_{IDLH}(t+1)$, and selecting an optimal candidate.

In the DLH search strategy, each dimension of the new position of the wolf $X_i(t)$ is calculated by Formula (5), $$X_{IDLH,d}(t+1) = X_{i,d}(t) + ran \times (X_{n,d}(t) - X_{r,d}(t)) \quad (5)$$

wherein, $X_{n,d}(t)$ is a random neighbor selected from the neighborhood $N_i(t)$ constructed by DLH search strategy and $X_{r,d}(t)$ is a random wolf selected from the matrix Pop; $X_{i,d}(t)$ represents the position of the i-th wolf in the t-th iteration in the d-th dimension;

The DLH neighborhood $N_i(t)$ is constructed by Formula (6)

$$N_i(t) = \{X_{i,d}(t) \mid D_i(X_i(t), X_j(t)) \le R_i(t), X_j(t) \in Pop\} \quad (6)$$

$$R_i(t) = \|X_i(t) - X_{IGWO}(t+1)\| \quad (7)$$

wherein $D_i$ is the Euclidean distance between $X_i(t)$ and $X_j(t)$; $R_i(t)$ is the radius of the neighborhood, DLH uses the Euclidean distance between the current position of $X_i(t)$ and the candidate position $X_{IGWO}(t+1)$ to calculate the radius of the neighborhood by Formula (7).

S11: judging whether the fitness value of the optimal candidate is less than $X_i(t)$ or not;

S12: if yes, updating $X_i(t)$ with the optimal candidate; otherwise, keeping $X_i(t)$ unchanged in the matrix Pop; $X_i(t)$ represents the position of the i-th wolf in the t-th iteration;

The formula is specifically as follows:

$$X_i(t+1) = \{X_{IGWO}(t+1), \text{if } (X_{IGWO} < X_{IDLH}); X_{IDLH}(t+1), otherwis. \quad (8)$$

S13: judging whether to iterate to the maximum iterations; if not, executing the next step; otherwise, increasing the iterations by 1, and jumping to S8.

S14: obtaining an optimal parameter combination of the prediction model.

S15: training the prediction model based on the optimal parameter combination, obtaining an optimized convergent prediction model.

The optimal parameter combination includes: neurons 1, neurons 2, dropout, batch_size, the optimal parameter combination is input into IGWO-BiLSTM and trained to get the optimized convergent IGWO-BiLSTM network prediction model, and the network attack data is input into the prediction model to get the comparison between normal network traffic and attack network traffic, so that the attack can be predicted timely and accurately.

S16: based on the optimized convergent prediction model, identifying anomalies caused by network attacks.

The optimal parameter combination is substituted into the BiLSTM training prediction model, Mean Squared Error (MSE), Root Mean Squared Error (RMSE), Mean Absolute Error (MAE) and determining coefficient ($R^2$) are taken as evaluation indexes, which is used to compare the prediction performance of improved grey wolf optimization RNN (IGWO-RNN), improved grey wolf optimization LSTM (IGWO-LSTM), improved grey wolf optimization GRU (IGWO-GRU) and improved grey wolf optimization BiLSTM (IGWO-BiLSTM) proposed in the disclosure.

The attack data is input into the prediction model to carry out the attack experiment;

The statistical analysis on IPDCF value intervals of normal flow and predicted flow is performed to obtain the IPDCF value intervals [a, b] and [c, d] of normal flow and predicted flow, and the maximum value Z of IPDCF value interval [c, d] of predicted flow is obtained, the average error A between IPDCF value of predicted flow and IPDCF value of normal network is calculated, and a threshold value U=Z+A is set, as can be seen from Formula (9), when the deviation X between the real value and predicted value exceeds the preset threshold value, it is considered as abnormal traffic, and it can be judged that there is network attack behavior; when the deviation between the real value and the predicted value is large, but it does not exceed the preset threshold, it is considered that normal network congestion except abnormality has occurred.

if {X≥U, DOSandDDOS attack; otherwise, normal congestion  (9).

EXAMPLE

Figure 3:
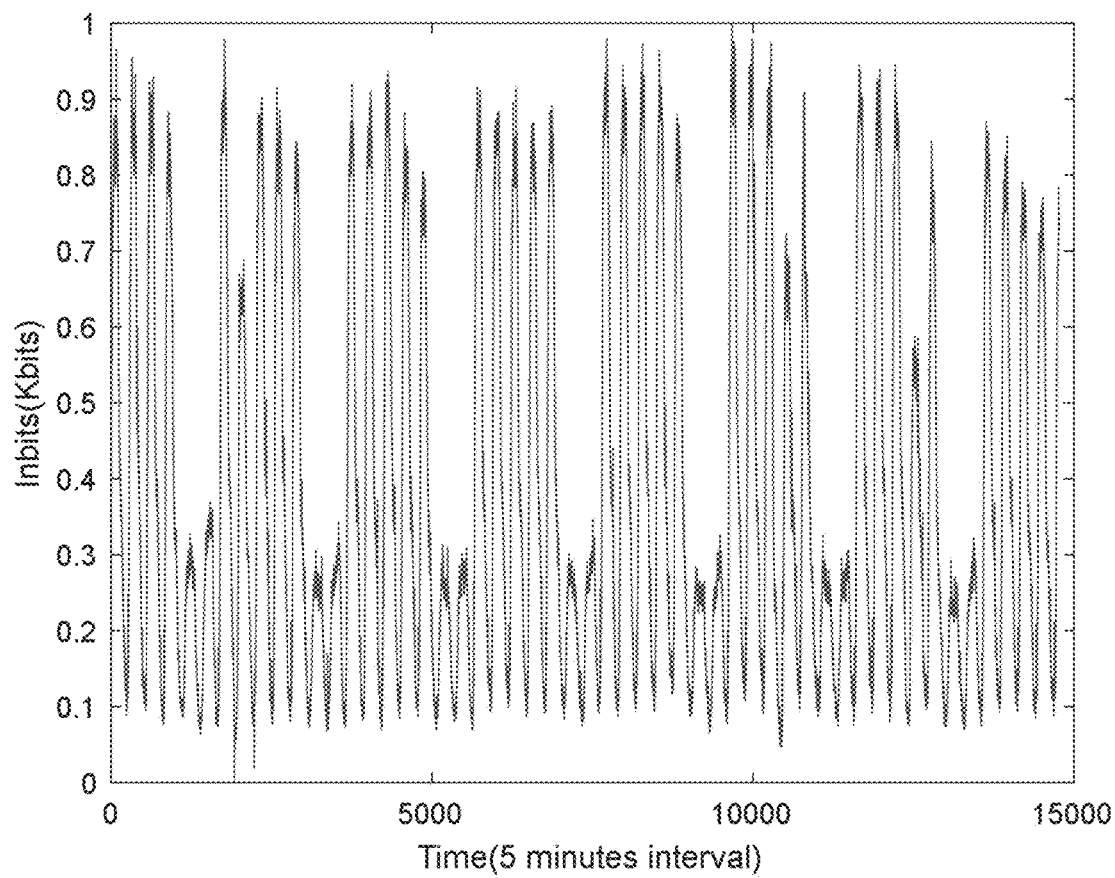
FIG. 3 is a normalized schematic diagram of ec_data data set of the present disclosure.
Figure 4A:
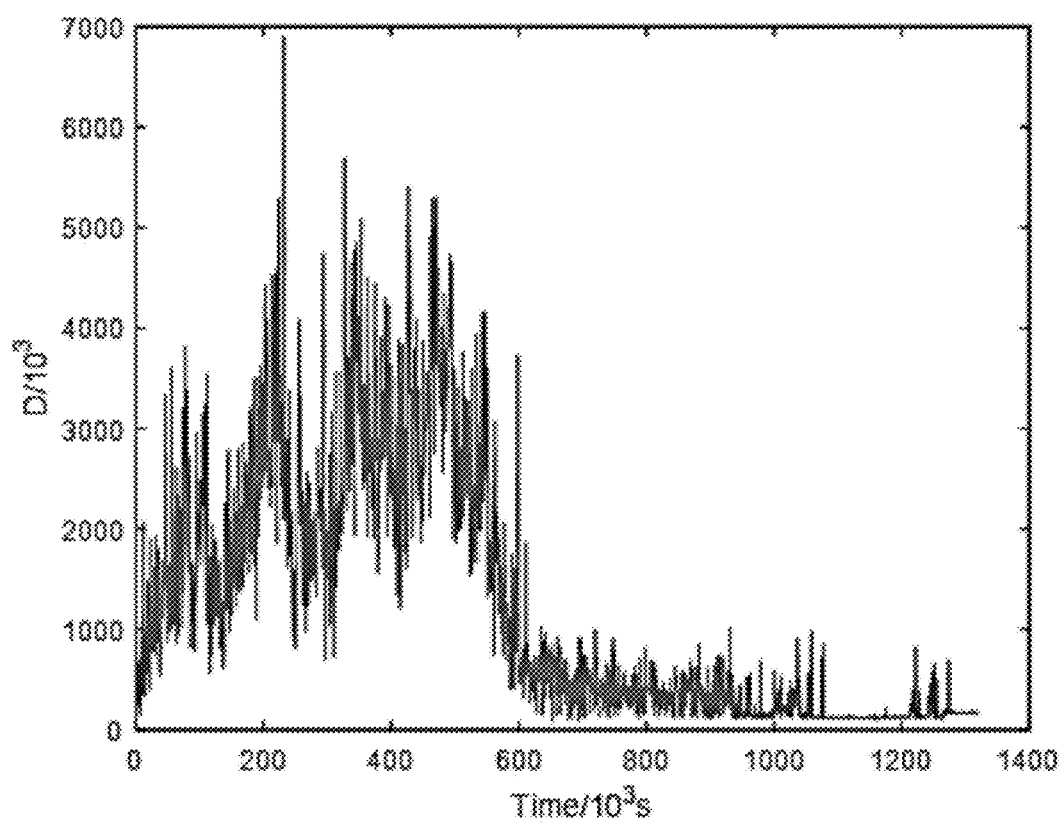
FIGS. 4A-4E show the first week 5d data characteristics of DARPA99 of the present disclosure.
Figure 4B:
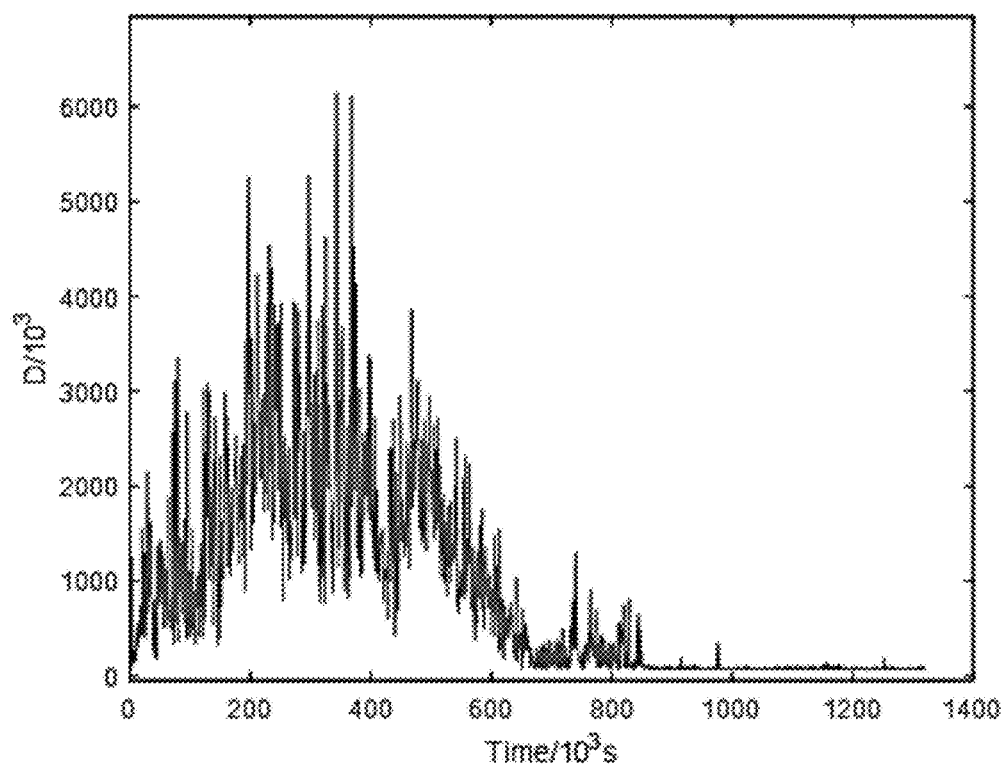
Figure 4C:
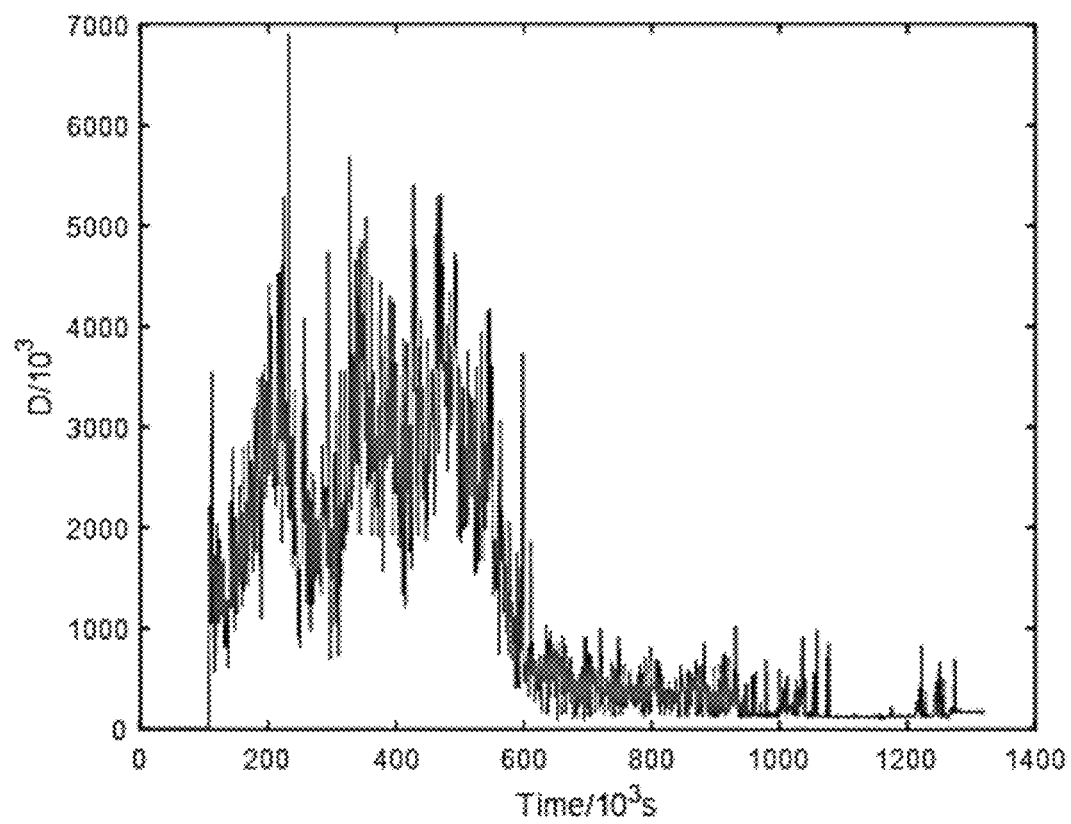
Figure 4D:
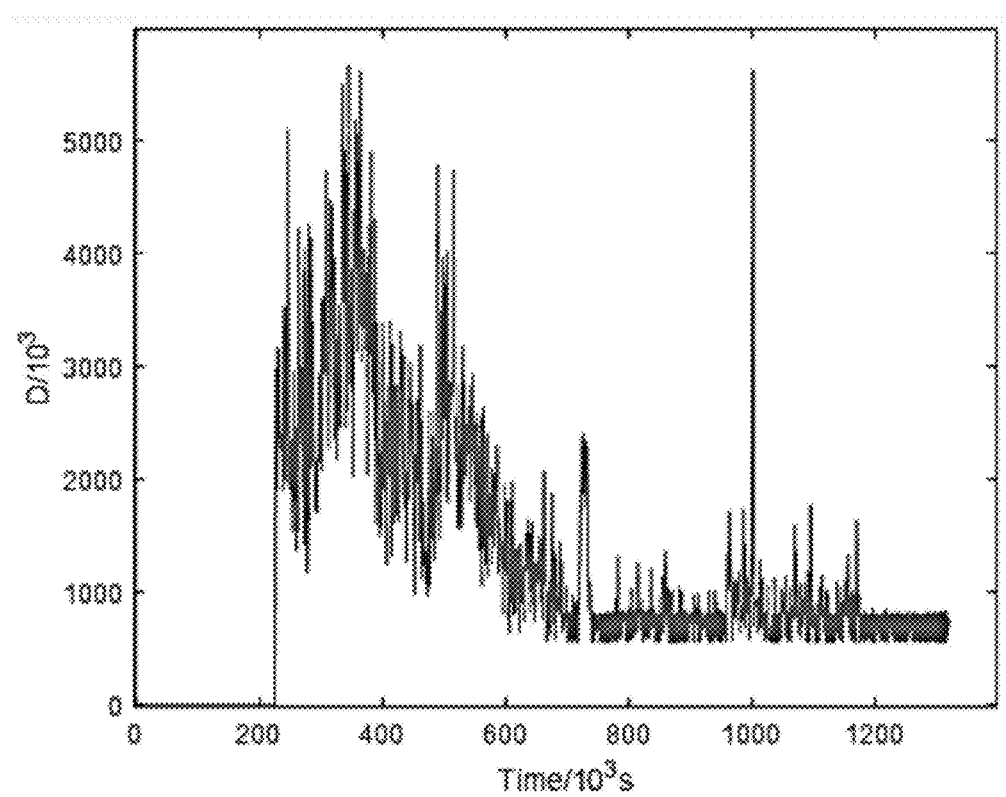
Figure 4E:
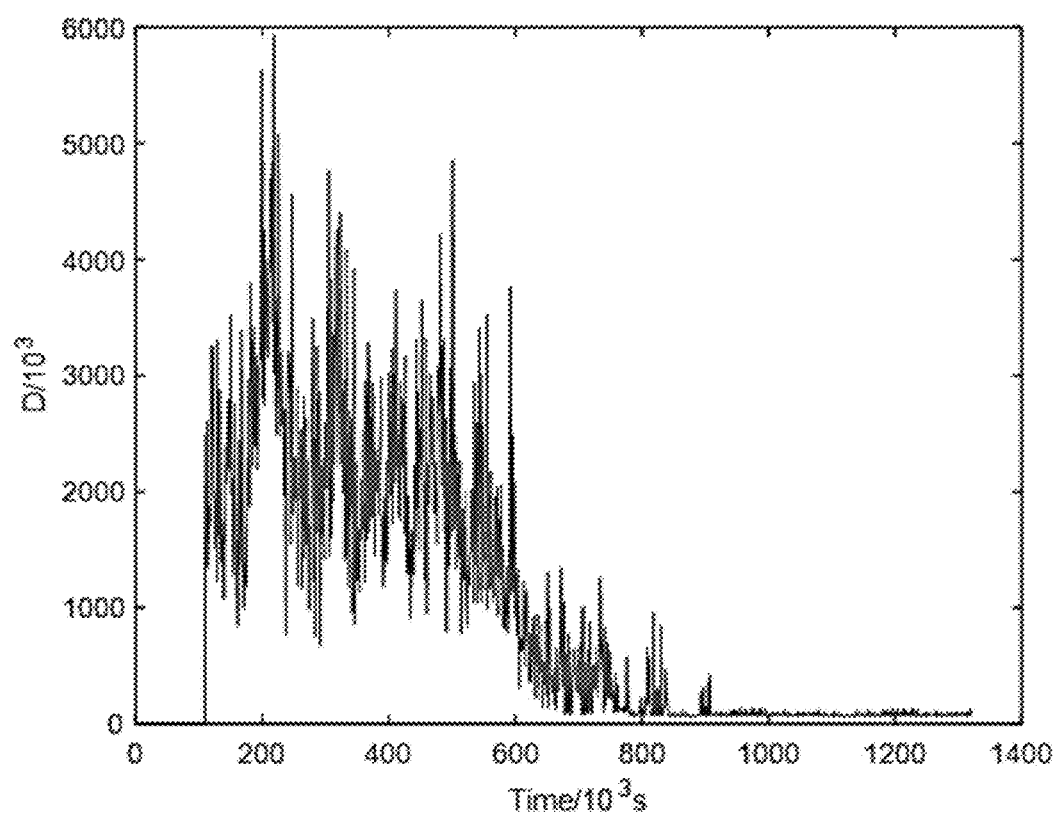

Aiming at the problems that information leakage, phishing and other events occur constantly, and the existing network attack prediction model has low accuracy and long response time of attack detection, the present disclosure provides a network attack prediction method based on the improved grey wolf algorithm to optimize BiLSTM. In this example, PyCharm is the development platform, Python is the development language and PyTorch is the deep learning framework, and the above method is adopted to predict network traffic attacks, the following is the specific process:

Step 1: Internet traffic (ec_data) of private Internet service provider (ISP), as shown in FIG. 3; 3-week network traffic (DARPA99) collected by Lincoln Laboratory of MIT in 1999, as shown in FIGS. 4A-4E; DOS and DDOS attack data set (DARPA00) collected by Lincoln Laboratory of MIT in 2000, were used.

Figure 2:
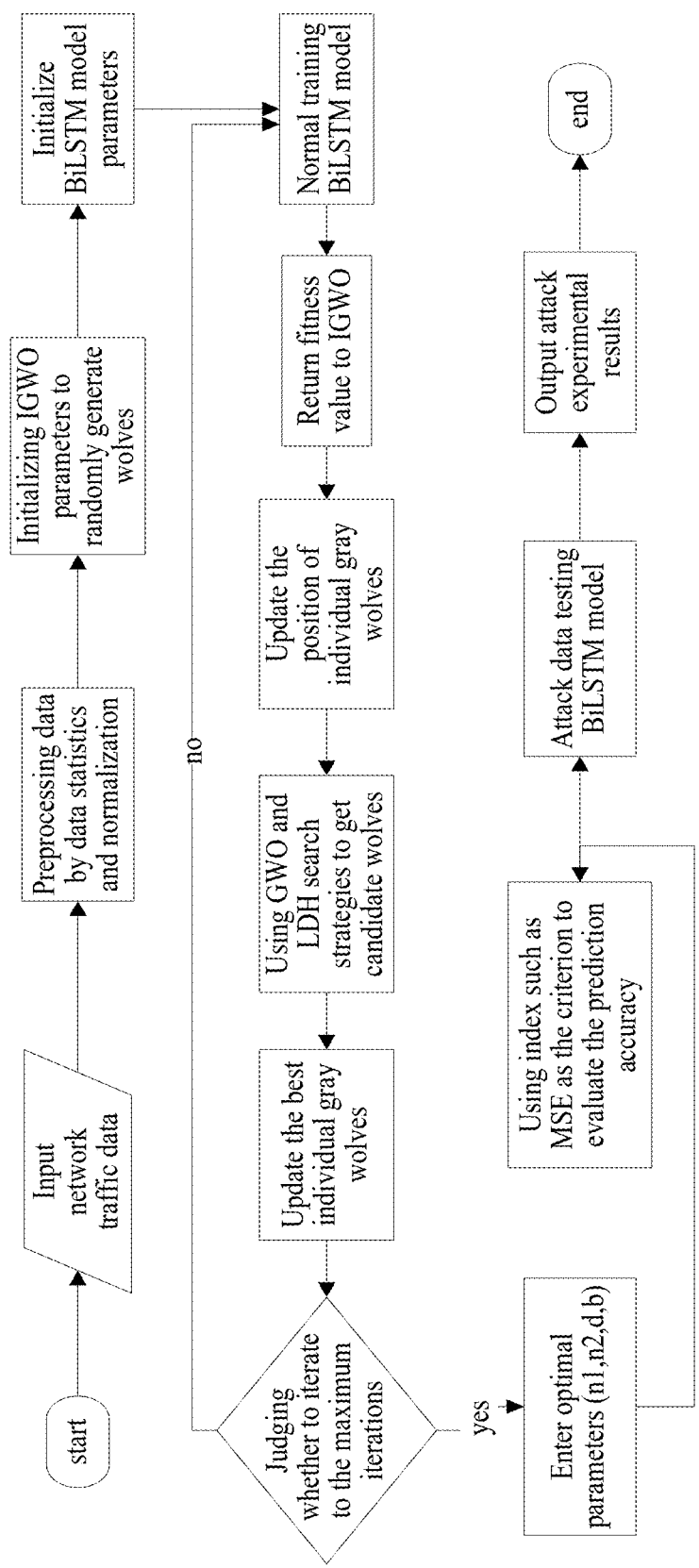
FIG. 2 is a flowchart of IGWO-BiLSTM of the present disclosure.
Figure 5:
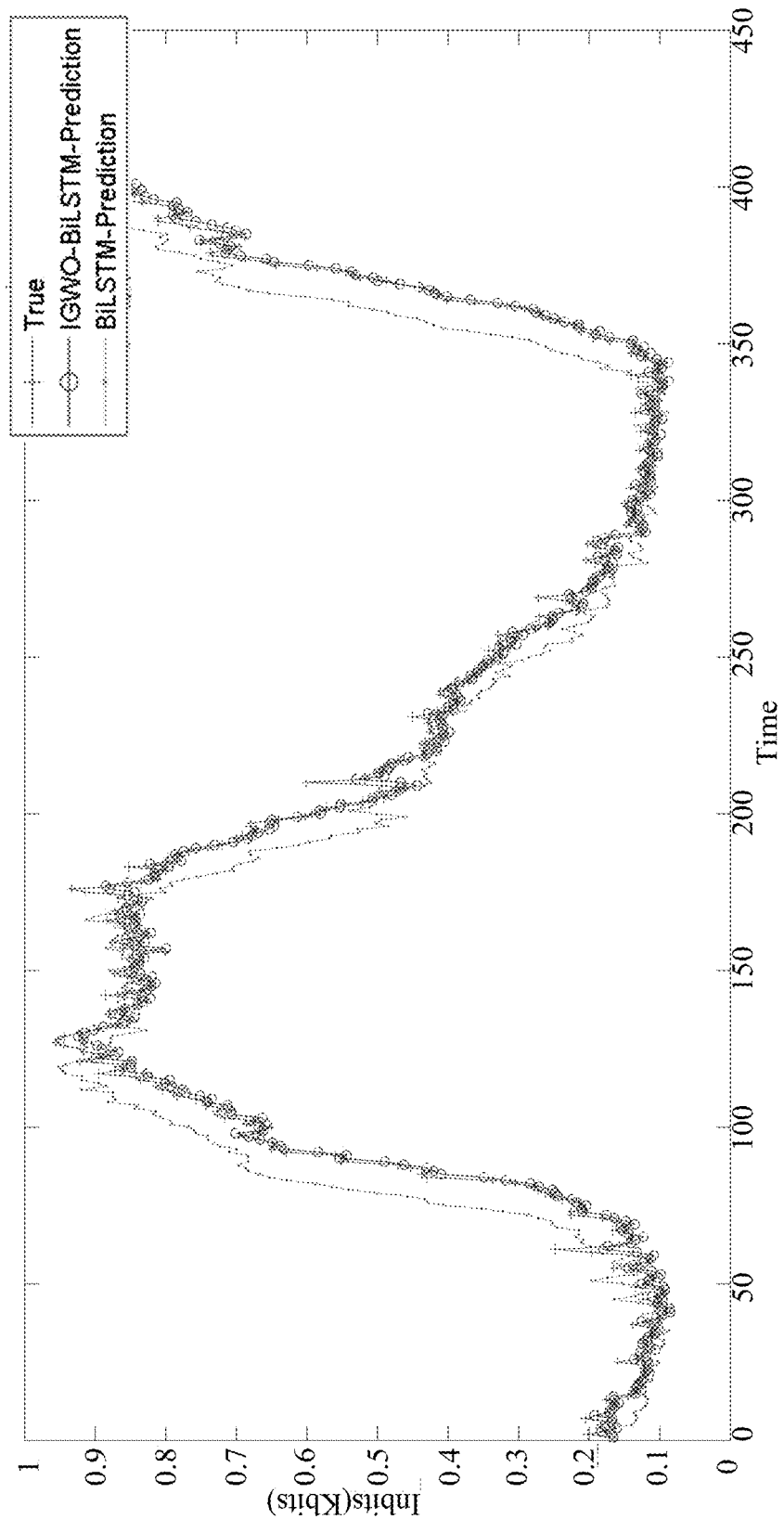
FIG. 5 is a partial comparison diagram of the real value and the predicted value of ec_data of the present disclosure.
Figure 6:
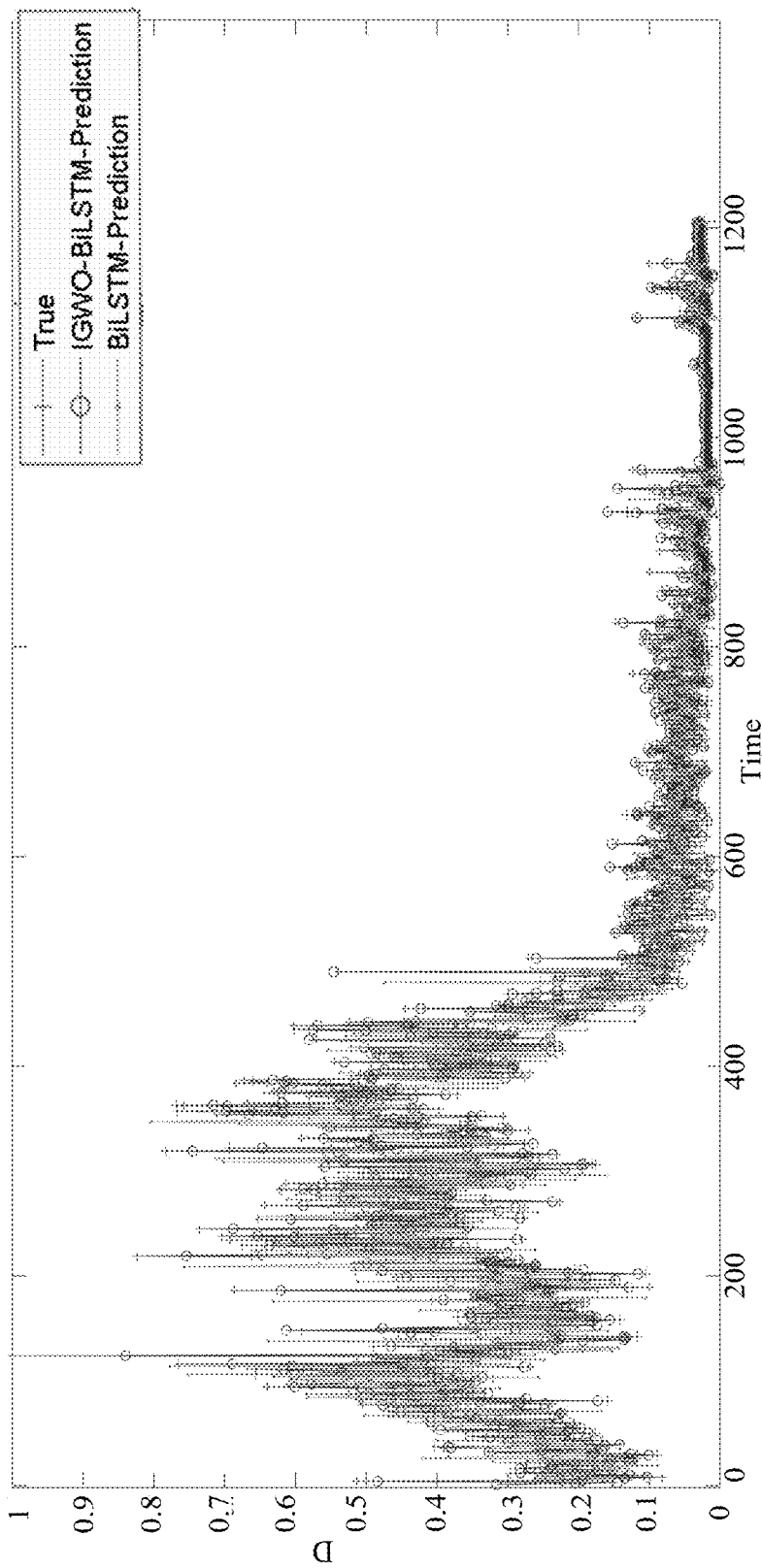
FIG. 6 is a comparison diagram of the actual value and the predicted value of DARPA99 of the present disclosure.

Step 2: the network traffic obtained in step 1 was taken as input, as shown in FIG. 1, and the prediction model in the method was loaded, the IGWO-BiLSTM prediction process was shown in FIG. 2, and the prediction of network traffic attack was obtained, the partial comparison diagram of the real value and predicted value of ec_data was shown in FIG. 5, and the comparison diagram of the real value and predicted value of DARPA99 is shown in FIG. 6.

Step 3: the evaluation indexes used in the present disclosure included Mean Squared Error (MSE), Root Mean Squared Error (RMSE), Mean Absolute Error (MAE) and determination coefficient ($R^2$);

The specific formula is as follows:

$$MSE = \frac{1}{n}\sum_{i=1}^{n}(Y_i - \hat{Y}_i)^2$$

$$RMSE = \sqrt{\frac{1}{n}\sum_{i=1}^{n}(Y_i - \hat{Y}_i)^2}$$

$$MAE = \frac{1}{n}\sum_{i=1}^{n}|Y_i - \hat{Y}_i|$$

$$R^2 = 1 - \sum_{i=1}^{n}\frac{(Y_i - \hat{Y}_i)^2}{(Y_i - \overline{Y}_i)^2}$$

wherein, $Y_i$ represents the real value, $\hat{Y}_i$ represents the predicted value and $\overline{Y}_i$ represents the average value of the real value.

Figure 7:
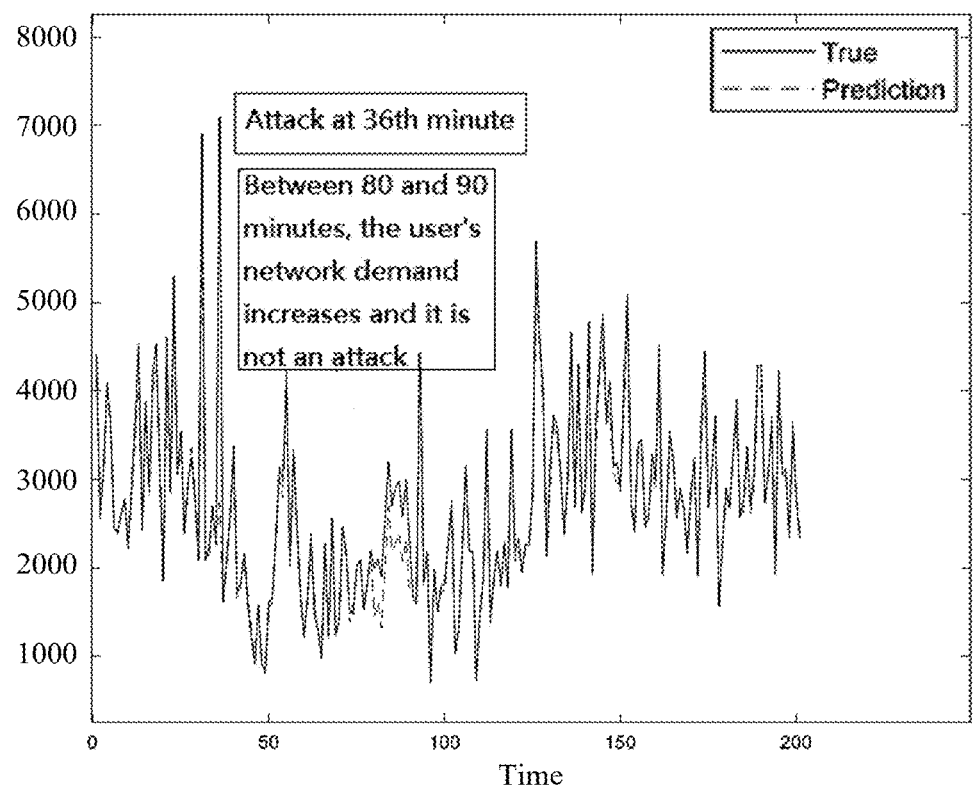
FIG. 7 is a schematic diagram of the experimental results of simulated attacks of the present disclosure.

Step 4: an attack experiment was conducted on the prediction model to get the prediction result of the attack. As shown in FIG. 7, at the 36th minute, the deviation between the real value and the predicted value exceeded the threshold, and it was judged that a network attack has occurred at this time. At the 80th-90th minute, although the deviation between the real value and the predicted value was large, it did not exceed the threshold, so it was not judged as a network attack, but as the actual network demand of users has increased at this time, so as to avoid false alarm.

Each embodiment in this specification is described in a progressive way, and each embodiment focuses on the differences from other embodiments, so it is only necessary to refer to the same and similar parts between each embodiment.

In this specification, specific examples are used to explain the principle and implementation of the present disclosure, and the descriptions of the above examples are only used to help understand the method and core ideas of the present disclosure. At the same time, according to the idea of the present disclosure, there will be changes in the specific implementation and application scope for those ordinary skilled in this field. To sum up, the content of this specification should not be construed as a limitation of the present disclosure.

What is claimed is:

1. A network attack prediction method, comprising:
S1: acquiring a network traffic data set;
S2: preprocessing the network traffic data set to obtain a preprocessed network traffic data set;
S3: performing time series modeling on the preprocessed network traffic data set to obtain a time series;
S4: performing data feature analysis on the time series to obtain a feature analysis result;
S5: based on the feature analysis result, dividing the network traffic data set into a normal traffic data set and an attack traffic data set according to a network traffic;
S6: initializing parameters of a grey wolf algorithm;
S7: constructing a prediction model and initializing parameters of the prediction model;
S8: using a grey wolf optimizer (GWO) search strategy to obtain a first candidate $X_{IGWO}(t+1)$ of an optimal grey wolf;
S9: using a hunting dimension learning hunting (DLH) search strategy to obtain another candidate $X_{IDLH}(t+1)$ of the optimal grey wolf;

S10: comparing fitness values of the first candidate $X_{IGWO}(t+1)$ and another candidate $X_{IDLH}(t+1)$, and selecting an optimal candidate;

S11: judging whether the fitness value of the optimal candidate is less than $X_i(t)$ or not;

S12: (i) updating $X_i(t)$ with the optimal candidate when the fitness value of the optimal candidate is less than $X_i(t)$ and (ii) keeping $X_i(t)$ unchanged in a matrix Pop; $X_i(t)$ represents a position of an i-th wolf in a t-th iteration when the fitness of the optimal candidate is greater than or equal to $X_i(t)$ wherein the matrix Pop comprises the whole population of wolves;

S13: judging whether to iterate to maximum iterations, and (i) executing a next step when not iterating to the maximum iterations and (ii) increasing the iterations by 1 and jumping to the S8 when iterating to the maximum iterations;

S14: obtaining an optimal parameter combination of the prediction model;

S15: training the prediction model based on the optimal parameter combination and obtaining an optimized convergent prediction model;

S16: based on the optimized convergent prediction model, identifying anomalies caused by network attacks.

2. The network attack prediction method according to claim 1, wherein the network traffic data set comprises Internet traffic ec_data, network traffic DARPA99 and DDOS attack data set DARPA00.

3. The network attack prediction method according to claim 2, wherein the operation of preprocessing the network traffic data set comprises the following steps:

normalizing the ec_data;

performing data sampling operation on the network traffic DARPA99 and the DDOS attack data set DARPA00 at a time interval of 1 minute, obtaining a number of data packets per minute as statistical characteristics IP packet statistical signature (IPDCF) of internet protocol (IP) data packets:

$$IPDCF = \sum_{T_i \square t \square T_{i+1}} P_t$$

wherein $T_{i+1}-T_i=1$ minute, $P_t$ is a data packet.

4. The network attack prediction method according to claim 3, wherein the operation of performing the data feature analysis on the time series to obtain the feature analysis result comprises the following steps:

sampling the IPDCF at a time interval of $\Delta t=1$ minute, and calculating an IPDCF value of each sampling, and after m times of sampling, obtaining a period T:

$$T(M, \Delta t) = \{IPDCF, i = 1, 2, \ldots, M\}$$

wherein M is a data set length, $\Delta t=1$ minute.

5. The network attack prediction method according to claim 4, wherein the operation of, based on the optimized convergent prediction model, identifying the anomalies caused by the network attacks comprises the following steps:

inputting the attack traffic data set into the optimized convergent prediction model to perform an attack experiment;

performing a statistical analysis on IPDCF value intervals of normal flow and predicted flow to obtain the IPDCF value intervals [a, b] and [c, d] of normal flow and predicted flow;

acquiring a maximum value Z of the IPDCF value interval [c, d] of the predicted flow;

calculating an average error A between the IPDCF value of the predicted flow and a IPDCF value of a normal network, and setting a threshold U=Z+A;

when a deviation X between a real value and a predicted value is greater than or equal to the preset threshold U, it is considered as abnormal traffic, and is allowed to be judged that there is network attack behavior; when the deviation X between the real value and the predicted value is less than the preset threshold U, it is considered that a normal network congestion has occurred.

6. The network attack prediction method according to claim 1, wherein the operation of initializing the parameters of the grey wolf algorithm comprises the following steps:

randomly generating wolves, a total number N=50, the maximum iterations Maxiter=10 and a dimension D of a problem is a number of BiLSTM optimization parameters D=4, number neurons 1 and neurons 2 of hidden layer units, a forgetting rate dropout and a batch size of BiLSTM correspond to parameter coordinates of individual positions of wolves, and upper and lower limits are set ub=[200, 200, 0.9, 10], lb=[32, 32, 0.1, 1];

the position of the i-th wolf in the t-th iteration is expressed as:

$$X_i(t) = \{x_{i1}, x_{i2}, \ldots, x_{iD}\} 0 \le i \le N,$$

wherein the whole population of wolves is stored in a matrix with N rows and D columns, and D is the dimension of the problem.

7. The network attack prediction method according to claim 1, wherein the operation of using the GWO search strategy to obtain the first candidate of the optimal grey wolf $X_{IGWO}(t+1)$ comprises the following steps:

according to the fitness value, dividing the wolves into four grades: α, β, δ, ω; α as an optimal solution, β as a suboptimal solution, δ as a best solution, ω as a candidate solution, a hunting process is guided by α, β and δ, ω follows α, β and δ to advance to the prey, and a position of the prey corresponds to a solution of the problem;

three wolves α, β, δ with a minimum fitness value are selected for GWO search, and positions of other gray wolves ω are updated to get the first candidate $X_{IGWO}(t+1)$;

the operation of using the hunting DLH search strategy to obtain another candidate of the optimal grey wolf $X_{IDLH}(t+1)$ adopt the following formula:

$$X_{IDLH,d}(t+1) = X_{i,d}(t) + ran \times (X_{n,d}(t) - X_{r,d}(t)),$$

wherein $X_{n,d}(t)$ is a random neighbor selected from a neighborhood $N_i(t)$ constructed by DLH search strategy and $X_{r,d}(t)$ is a random wolf selected from the matrix Pop; $X_{i,d}(t)$ represents the position of the i-th wolf in the t-th iteration in a d-th dimension;

$$N_i(t) = \{X_{i,d}(t) \mid D_i(X_i(t), X_j(t)) \le R_i(t), X_j(t) \in Pop\}$$

$$R_i(t) = \|X_i(t) - X_{IGWO}(t+1)\|$$

wherein $D_i$ is an Euclidean distance between $X_i(t)$ and $X_j(t)$; $R_i(t)$ is a radius of the neighborhood, $X_i(t)$ represents the position of the i-th wolf in the t-th iteration and $X_j(t)$ represents a position of a j-th wolf in the t-th iteration.

8. A computer equipment, comprising a memory and a processor, wherein the memory stores a computer program, and the processor implements the network attack prediction method according to claim 1 by executing the computer program.

9. A non-transitory computer-readable storage medium, wherein a computer program is stored on the computer-readable storage medium, and when executed by a processor, the computer-readable storage medium implements the network attack prediction method according to claim 1.

\* \* \* \* \*